J. J. LINEBAUGH.
PROTECTIVE DEVICE.
APPLICATION FILED NOV. 23, 1916.

1,334,869.                                  Patented Mar. 23, 1920.

Inventor:
Jesse J. Linebaugh,
by
His Attorney.

UNITED STATES PATENT OFFICE.

JESSE J. LINEBAUGH, OF SCHENECTADY, NEW YORK, ASSIGNOR TO GENERAL ELECTRIC COMPANY, A CORPORATION OF NEW YORK.

PROTECTIVE DEVICE.

1,334,869.   Specification of Letters Patent.   Patented Mar. 23, 1920.

Application filed November 23, 1916. Serial No. 133,075.

*To all whom it may concern:*

Be it known that I, JESSE J. LINEBAUGH, a citizen of the United States, residing at Schenectady, county of Schenectady, State of New York, have invented certain new and useful Improvements in Protective Devices, of which the following is a specification.

My invention relates to protective devices and more particularly to devices for the protection of electrical translating apparatus.

The object of my invention is to provide a protective device for translating apparatus and in particular to provide a means for protecting dynamo-electric machines, and more specifically to prevent the occurrence of dangerous flash overs on such machines.

It has been well known for some time that overloads above a certain amount or short circuits have caused dynamo-electric machines to flash over causing disastrous conditions resulting often in the entire destruction of the machines and various schemes have been suggested and have been used for preventing the occurrence of such flash overs.

With the novel means of my invention, I am able to protect dynamo-electric machines from flash overs under all conditions which may exist and especially to protect machines of the direct current type. I accomplish this result by providing two circuit breakers, one of the ordinary type adapted to open the circuit of the machine on the side thereof in response to abnormal conditions up to a predetermined amount, and a second breaker of special construction adapted to open the circuit side of the machine on the other side thereof, in response to conditions above this predetermined amount. The second breaker normally shunts a resistance or current limiting means and is of such a construction that it can be automatically opened and the resistance included in circuit in an exceedingly short time or in a time shorter than that required for a commutator segment to pass from one brush to the next. The insertion of resistance within this exceedingly short time interval is sufficient to limit the current to the safe commutating capacity of the machine under all conditions.

Figure 1:
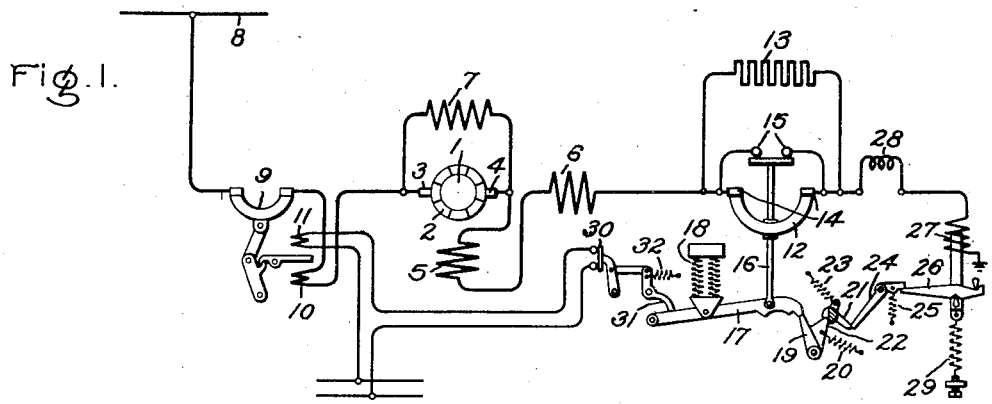
Figure 2:
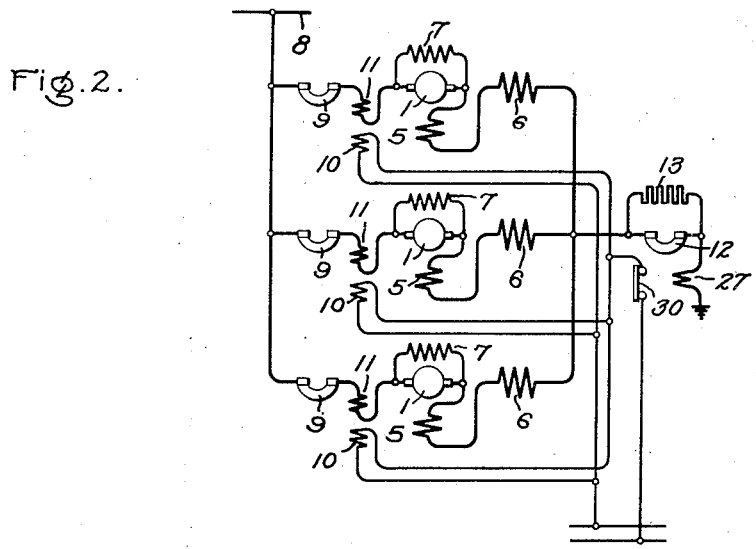
Figure 3:
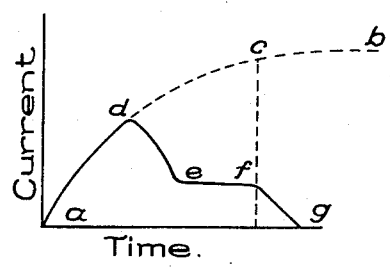

The novel features which I believe to be characteristic of my invention will be definitely indicated in the claims appended hereto; the features of construction and method of operation will be understood by reference to the following description taken in connection with the accompanying drawings which show the preferred embodiments of my invention and in which;

Figure 1 shows diagrammatically a dynamo-electric machine protected by my novel protective means, Fig. 2 is a diagrammatical illustration of the plurality of dynamo-electric machines protected by my novel device and Fig. 3 is an explanatory diagram of the operation of my protective device.

In Fig. 1, I have shown a dynamo-electric machine 1, by way of example, as a dynamo-electric machine of the direct current type provided with a commutator having a plurality of segments 2, coöperating brushes 3 and 4 and field windings 5, 6, and 7, the machine 1 being either of the self or separately excited type.

This dynamo-electric machine is shown, for purposes of illustration, as a direct current generator connected between conductor 8, which may be one side of a direct current railway system, and ground. For the protection of this machine, I place between the machine 1 and the conductor 8 or, as here shown, in the positive side of the machine, a circuit breaker 9, of the usual type, adapted to open automatically either in response to overload or drop in voltage on conductor 8 by means of overload coil 10 and low voltage coil 11. Between the machine 1 and ground or, as shown, in the negative side of the machine, I connect another element of my protective device comprising a circuit controlling device, such as a circuit breaker 12 of special construction adapted to be exceedingly quick acting and a resistance 13 of a value sufficient to limit the current to the safe commutating value of the machine protected. This resistance 13 is shunted by the breaker 12, when closed, but owing to the rapidity of opening of the breaker, is adapted to be included in series with the circuit through the machine within an exceedingly small time interval. As the features of construction of this exceedingly quick acting breaker 12 forms no part of my invention, it will be sufficient for this disclosure to briefly describe the construction of this breaker as follows:

This switch or circuit controlling device 12 is of the spring operated, magnetic blow out type and comprises primary and secondary contacts 14 and 15 respectively, carried by an operating member 16 which is pivotally carried near one end of an actuating lever 17. The lever 17 is actuated about a fixed point at its opposite end in response to heavy spring members 18 and is held in switch closing position by an extremely sensitive mechanism comprising a member 19 having an inclined bearing surface coöperating with a similar surface on the end of lever 17 and tending to move in a direction to disengage said coöperating surfaces under the action of a spring 20. To restrain the member 19, there is provided another member 21 having a plane engaging surface coöperating with the bearing surface of portion 22 of member 19. Member 21 is biased to move in a direction to release member 19 by a spring member 23. Coöperating with member 21 is another latching member 24, adapted to hold the member 21 in latched position but biased to release the member 21 in response to the action of spring member 25. Coöperating with the member 24 is still another latching member 26 supported in knife edge bearings and movable in response to the plunger of a trip coil 27 in series with the current through the switch.

When the switch 12 is closed, the mechanism just described is in latching position and the actuating lever 17 is biased to open under the compression of the spring member 18 which exerts a pressure of approximately 8,000 pounds. When the lever 26 is raised a very small amount in response to trip coil 27, which is sufficient to move the end lever 24 from its engagement with lever 21, the entire lever mechanism collapses within an exceedingly small time interval accelerated by the springs 20, 23 and 25 and the lever 17 is thereby released and moves with great rapidity under the compression of its springs 18 to open the switch under the influence of the blow out coil 28 and include the resistance 13 in the circuit, before the current exceeds the commutating capacity of the machine or in a time shorter than that required for a commutator segment 2 to pass from one brush of the machine to the next brush. For regulating the pick-up point of the tripping coil 27, a spring 29 is secured to the trip coil plunger the tension of which can be adjusted.

An auxiliary switch 30 is controlled by the operation of circuit breaker 12 being operatively related to the actuating lever 17 through a lever 31 which is maintained in engagement with lever 17 by means of a spring member 32. By this construction, the movement of lever 17 to switch closing position causes a closing of auxiliary switch 30 and spring 32 is tensioned to cause an opening of the switch 30 in response to the movement of the lever 17 to switch opening position. Auxiliary switch 30 controls the current of the low voltage coil 11 of breaker 8 in a member to be presently described. The breakers or switches 8 and 12 have their overload trip coils 10 and 27 respectively, so arranged that upon overloads up to a predetermined amount, trip coil 27 is unresponsive and trip coil 10 is alone operated, whereas on overloads above this predetermined amount or on short circuits both trip coils are responsive and both breakers are operated but owing to the quick operating features of breaker 12, it will open and insert resistances 13 prior to the opening of breaker 9. If for any reason breaker 9 is not automatically tripped open on such overloads, the opening of auxiliary switch 30 with the opening of breaker 12 causes the low voltage coil 11 to open the breaker 9.

I have found to prevent all flash overs of machines under all conditions which may exist, it is not only important to open circuit breaker 12 and insert the resistance 13 in series with the circuit through the machine in the exceedingly small time interval specified but it is also important that the quick acting breaker be arranged to connect the current limiting means 13 in the negative side of the machine or, if the machine is grounded, to include the resistance 13 in the connection between the machine 1 and ground.

Flash overs occur not only from one brush to the next but also from one brush to the frame of the machine which is grounded. It is my opinion that a flash over between brushes occurs due to the formation of an arc between a commutator segment and one brush and the lengthening of this arc by the revolution of the commutator until the arc is transferred to the next adjacent brush. To effectively prevent a flash over of this character, the circuit of the machine must be interrupted before a commutator segment can pass from one brush to the next and a resistance of proper value included in such circuit to prevent the current rising to abnormal value and to reduce the current with resultant arcing, to such a point that there is absolutely no possibility of flashing over.

The time necessary for a commutator segment to pass from one brush to the next depends, of course, upon the peripheral speed of the armature core, and upon the number of pairs of brushes which in turn depend on the pairs of poles, and also upon the number of commutator segments which in turn are determined by the voltage of the machine. I have determined, however, that if the required resistance is inserted in substantially 0.005 of a second, such resistance will be inserted in a time interval less than that required for a commutator segment to pass from one brush to the next in any commercial type of machine now built. The construction of the circuit breaker is such, as has been described, that it does open and insert the resistance 13 in this exceedingly short interval of time and therefore affords a means of protecting any machine from any character of flash over on any condition of overload.

Flash overs between one brush and the next often develop flash overs between one brush and the frame of the machine. In direct current machines having one terminal grounded, a flash over of this character between one brush, which is positive, and the frame of the machine, which is grounded, produces a short circuit on the machine. The short circuit current flows to ground through the frame of the machine and returns to the machine over the negative brush 4. This type of flash over is often disastrous to the machine. To prevent such a flash over and consequent short circuits, I preferably connect the quick acting device or breaker 12 in the ground or the negative side of the machine or between the negative brush and ground so that when the breaker 12 opens, the resistance 13 is inserted in the ground connection in such a short interval of time that the current is limited and hence the flash over prevented. Connecting the quick acting device 13 and inserting the resistance in the negative side of the machine, therefore, produces the useful, beneficial and highly improved result of preventing flash overs to the frame of the machine from short circuiting the machine. Thus I have provided a device which protects the machine from both flash overs between brushes and between one brush and the frame of the machine and the rapidity with which the circuit is opened, the resistance 13 inserted and the maximum current limited protects a machine from flashing over under all abnormal conditions.

The operation of my protective device and my novel method of protecting dynamo-electric machines may be briefly described as follows:—When an overload below a certain predetermined amount occurs on the conductor 8, for instance, of 300 to 350 per cent. of normal load, the trip coil 10 alone, is sufficiently energized to trip circuit breaker 9 and disconnect the machine 1 from the circuit or load from conductor 8. The trip coil 27 for circuit breaker 12, under these conditions, is not sufficiently energized to open its breaker 12. Under these conditions which would be due to ordinary conditions of overload, it is sufficient to prevent flash overs, that the breaker 9 alone be opened in the time it takes an ordinary circuit breaker to open. If, however, overloads above 350% appear on the system, which values of overload are considered to be short circuits, then both trip coils 10 and 27 are energized to trip both breakers 9 and 12, respectively. Owing, however, to the exceedingly quicker action of breaker 12, it opens prior to breaker 9 and inserts the resistance 13 in the negative grounded side of the machine and then the breaker 9 opens to break the circuit of the machine on its positive side. The breaker 12 is so quick in operation, as has been stated, that before a flash over can occur between brushes 3 and 4, for the reasons before stated, the resistance is inserted and quickly cuts down the current to a point well within the commutating capacity of the machine as best shown graphically by Fig. 3 and the opening of the quick acting breaker and insertion of the resistance 13 in the grounded or negative side of the machine 1 prevents a flash over from occurring.

On overloads of 350% and over, the current rise in the circuit of the machine 1 is shown by the curve $a\ b$, the point $c$ on this curve representing the value of current sufficient to cause a flash over. By the use of my novel protective means, as soon as the current rises to the value represented by $d$, on the curve $a\ b$, the trip coil 27 is sufficiently energized to trip circuit breaker 12 which opens with great rapidity to insert the resistance 13 in the generator circuit, the fall of current due to the opening of the breaker 11 and the insertion of the resistance 13 being shown by the drop in current along the line $d\ e$ the portion of the curve $e\ f$ is practically horizontal and shows the time which elapses before the standard type of breaker 9 starts to open. Trip coil 10 is energized simultaneously with trip coil 27 but owing to the greater time of opening required for the breaker 9, this breaker does not open until the current has fallen to the point $f$. The portion $f\ g$ then shows the falling off of the current to zero upon opening of the circuit breaker 9. Thus instead of the current in the circuit of the machine following the curve $a\ b$, my protective means acts to cause the current through the machine to follow the curve $a,\ d.\ e,\ f,\ g$, which current is harmless to the machine.

In Fig. 2 is shown my novel protective device for the protection of a plurality of dynamo-electric machines 1 supplying a common conductor 8, each machine having its own circuit breaker 9 on the positive side of the machine and but one quick acting circuit breaker 12 in the common ground connection for all the machines shunting a resistance 13 of a value sufficient to limit the current to the commutating capacity of any machine. The operation of my protective means for the protection of a plurality of breakers is the same as that described for the protection of one machine and all the machines are thereby protected from flash overs of any character.

My invention may be embodied in other forms than that shown and described and I, therefore, do not wish to be restricted to the precise construction shown but intend to cover by the appended claims all changes and modifications which are within the scope of my invention and will be apparent to those skilled in the art.

What I claim as new and desire to secure by Letters Patent of the United States, is:

1. The method of protecting a dynamo electric machine from flash overs which consists in automatically including a current limiting means in the circuit of said machine in a shorter time interval than that required for a commutator segment to pass from one brush to the next.

2. The method of protecting a commutating dynamo electric machine from flash overs which consists in automatically including a current limiting means in the circuit of said machine on the negative side thereof in a time interval sufficient to prevent the current through the machine from exceeding the safe commutating capacity thereof.

3. The method of protecting direct current dynamo electric machines having one terminal grounded from flash overs which consists in automatically including a current limiting means in the ground circuit of said machine in a time interval sufficient to prevent the current through the machine from exceeding the safe commutating capacity thereof.

4. The method of protecting direct current dynamo electric machines which consists in automatically opening the circuit of said machine on one side thereof in response to abnormal conditions up to a predetermined amount, and automatically including a resistance in the circuit of said machine on the other side thereof in response to abnormal conditions above said predetermined amount in a time sufficient to prevent the current through the machine from exceeding the safe commutator capacity thereof.

5. The method of protecting dynamo electric machines having one terminal grounded which consists in automatically including a current limiting means between the grounded terminal of said machine and ground and in a shorter time interval than that required for a commutator segment to pass from one brush to the next, and subsequently opening the circuit of said machine under said reduced current.

6. A protective device for commutating dynamo electric machines comprising a resistance adapted to be connected in the circuit of said machine, and a circuit controlling device normally shunting said resistance but adapted to open said shunt under predetermined conditions to include said resistance in the circuit of said machine in a time interval shorter than that required for a commutator segment to pass from one brush to the next.

7. In an apparatus for the protection of commutating dynamo electric machines, the combination with a current limiting means adapted to be connected in the circuit of said machine, of a quick acting circuit controlling device acting when closed to shunt said current limiting means, and means responsive to abnormal conditions above a predetermined amount for automatically opening said controlling device to include said current limiting means in circuit in a shorter time interval than that required for a commutator segment to pass from one brush to the next.

8. In an apparatus for protecting dynamo electric machines, the combination with an exceedingly quick acting circuit opening device, a current limiting means normally shunted by said device, and means operative in response to predetermined abnormal conditions for automatically opening said device to include said current limiting means in the circuit of the machine in a time interval sufficient to prevent the current through the machine from exceeding the safe commutating capacity thereof, and a second switch operative upon predetermined abnormal conditions to open the circuit of said machine after said resistance has been included in said circuit.

9. A protective device for commutating direct current dynamo electric machines having one terminal grounded comprising a quick acting circuit breaker in the circuit of the grounded side of said machine adapted to automatically open in a time interval shorter than that required for a commutator segment to pass from one brush to the next, and a resistance shunted by said breaker when closed but included in said circuit when said breaker opens to prevent the current from exceeding the safe commutating capacity of the machine.

10. A protective device for commutating direct current dynamo electric machines, comprising a quick acting circuit breaker in the circuit of said machine for automatically opening in a shorter time interval than that required for a commutator segment to pass from one brush to the next, and a current limiting means automatically included in the circuit of said machines when said circuit breaker opens.

11. The combination with a direct current dynamo-electric machine having one terminal grounded, of means operative in response to predetermined conditions in the circuit of said machine for automatically including a resistance in the grounded connection of said machine to prevent the current in the machine from exceeding the safe commutating capacity thereof.

12. The combination with a direct current dynamo-electric machine having one terminal grounded, a device in the grounded connection operative in response to predetermined conditions to automatically open said connection before a commutator segment can pass from one brush to the next, and a current limiting means adapted to be automatically included in said grounded connection upon the opening of said device.

13. The combination with a direct current dynamo-electric machine having one terminal grounded, of a resistance in the ground connection, means normally short-circuiting said resistance and operative under predetermined abnormal conditions to include said resistance in said grounded connection before a commutator segment can pass from one brush to the next.

14. The combination with a direct current dynamo-electric machine having its negative terminal grounded, of means operative in response to predetermined conditions in the circuit of said machine for automatically including a resistance in the negative side of the machine in a time sufficient to prevent the current in the machine from exceeding the safe commutating capacity thereof.

15. A protective device for dynamo electric machines comprising in combination a current limiting means adapted to be inserted in the circuit of the machine before a commutator segment can pass from one brush to the next, and means subsequently operative to open the circuit of said machine under said reduced current.

In witness whereof I have hereunto set my hand this 22nd day of November 1916.

JESSE J. LINEBAUGH.